(12) United States Patent
Lynch

(10) Patent No.: US 6,459,179 B1
(45) Date of Patent: Oct. 1, 2002

(54) ELECTRICAL MACHINES

(76) Inventor: Cedric Lynch, 8 Heath Drive, Potters Bar, Hertfordshire En6 1EH (GB)

(*) Notice: Subject to any disclaimer, the term of this patent is extended or adjusted under 35 U.S.C. 154(b) by 0 days.

(21) Appl. No.: 09/490,829

(22) Filed: Jan. 25, 2000

Related U.S. Application Data

(62) Division of application No. 08/669,403, filed as application No. PCT/GB94/02821 on Dec. 23, 1994, now Pat. No. 6,040,645.

(30) Foreign Application Priority Data

Dec. 23, 1993 (GB) .............................................. 9326353

(51) Int. Cl.[7] .......................... H02K 9/00; H02K 9/06; H02K 3/04
(52) U.S. Cl. .......................... 310/52; 310/63; 310/268; 310/233
(58) Field of Search .......................... 310/268, 62, 63, 310/201, 207, 233, 237, 52; 29/597, 733

(56) References Cited

U.S. PATENT DOCUMENTS

| | | | |
|---|---|---|---|
| 1,392,349 A | 10/1921 | Neuland | 310/59 |
| 1,692,371 A | 11/1928 | Froesch | 310/59 |
| 2,608,677 A | 8/1952 | Wightman et al. | 310/59 |
| 3,081,411 A | 3/1963 | Wiley | 310/254 |
| 3,590,666 A | 7/1971 | Lazaroiu et al. | 310/268 |
| 3,648,360 A | * 3/1972 | Tucker | 29/597 |
| 3,670,190 A | 6/1972 | Goebel | 310/60 |
| 3,848,145 A | 11/1974 | Goebel et al. | 310/60 |
| 3,869,788 A | * 3/1975 | Lazaroiu et al. | 29/597 |
| 4,311,935 A | 1/1982 | Hoyss | 310/227 |
| 4,321,499 A | * 3/1982 | Gupta | 310/268 |
| 4,456,846 A | * 6/1984 | Stokes | 310/233 |
| 4,635,350 A | 1/1987 | Olsen et al. | 310/201 |
| 4,766,377 A | 8/1988 | Parkinson et al. | 310/58 |
| 4,874,959 A | 10/1989 | Sheridan | 310/89 |
| 5,076,762 A | 12/1991 | Lykes et al. | 310/59 |
| 5,182,482 A | 1/1993 | Burke | 310/89 |
| 5,796,190 A | 8/1998 | Takeda et al. | 310/58 |

FOREIGN PATENT DOCUMENTS

| | | |
|---|---|---|
| DE | 9305152 | 6/1993 |
| EP | 0104450 | 4/1984 |
| EP | 0230759 | 8/1987 |
| EP | 0413113 | 2/1991 |
| FR | 2534085 | 4/1984 |
| GB | 324753 | 2/1930 |
| GB | 345177 | 3/1931 |
| GB | 377665 | 7/1932 |
| GB | 734696 | 8/1955 |
| GB | 879793 | 10/1961 |
| GB | 880711 | 10/1961 |
| GB | 893853 | 4/1962 |
| GB | 1003991 | 9/1965 |
| GB | 1505949 | 4/1978 |
| GB | 2059175 | 4/1981 |
| GB | 2184613 | 6/1987 |
| GB | 2265553 | 10/1993 |
| JP | 4038150 | 2/1992 |

* cited by examiner

*Primary Examiner*—Karl Tamai
(74) *Attorney, Agent, or Firm*—Morgan, Lewis & Bockius LLP

(57) ABSTRACT

An electrical machine, such as an electric motor, dynamo or alternator has a casing with cooling vents enabling cooling fluid to flow into and out of the casing when the rotor of the electrical machine rotates. The rotor may be formed from conductive elements connected together at their outer regions by interconnecting members, which have vanes arranged to direct cooling fluid over the outer regions. Each conductive element is a metal strip with legs bent in opposite directions relative to the plane of the strip. Portions of the windings of the rotor are spaced apart to allow fluid to flow between the windings to enhance the cooling effect. With a current carrying rotor, the magnetic field intensity across the rotor is varied by varying the axial separation of the rotor and the stator.

4 Claims, 7 Drawing Sheets

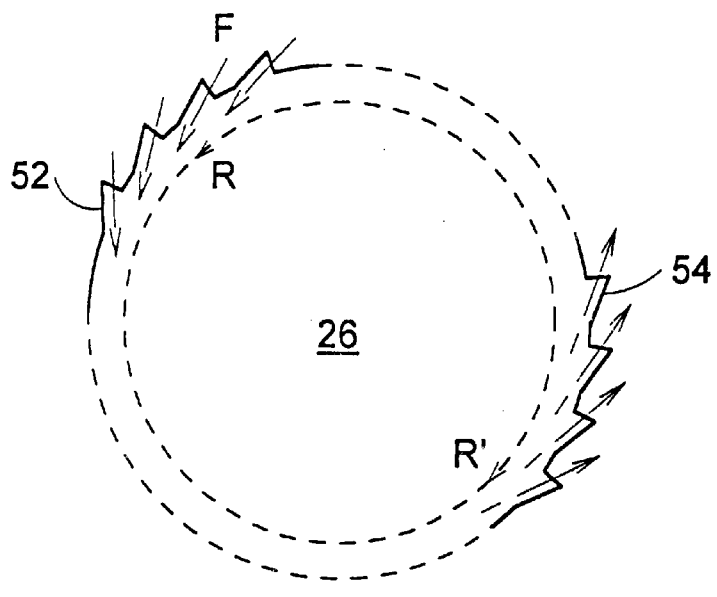
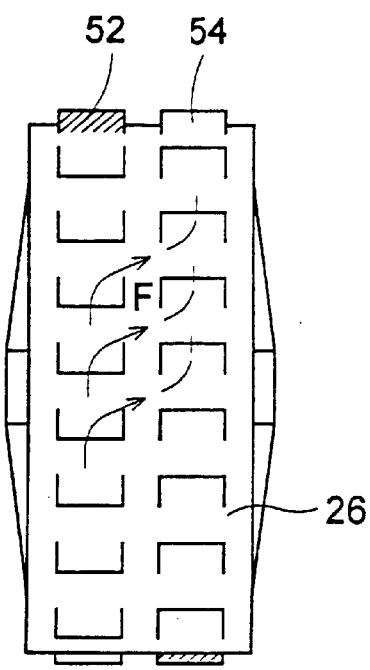
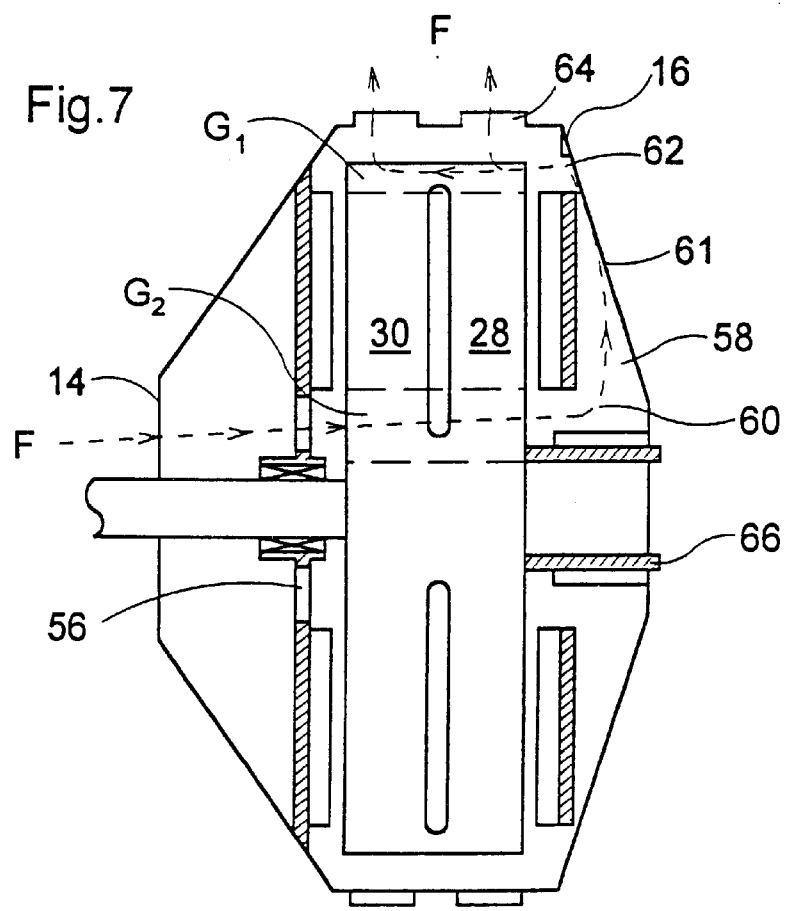

ELECTRICAL MACHINES

This application is a division of application Ser. No. 08/669,403, filed Apr. 13, 1998, now U.S. Pat. No. 6,040,645, which is a 371 of PCT/GB94/02821, filed Dec. 23, 1994.

The present invention relates to electrical machines which convert mechanical energy into electrical energy, or vice versa, by an interaction between a magnetic field and an electric current. In particular, the present invention relates to a casing for such an electric machine, a rotor for such an electric machine, a conductive element of a rotor winding for such an electric machine, and a method of forming such a conductive element. Examples of such electric machines are electric motors, dynamos and alternators.

In known electric machines, the assembly of a rotor winding may be time consuming and therefore expensive. Moreover the rotor winding often comprises a large number of different parts, which increases the overall cost of the electric machine.

The performance of such electric machines may also be limited by the amount of heat generated in the rotor winding and in the region of the commutator. As a result of this limited performance, the range of applications of such electric machines, particularly in electrically powered vehicles, has been restricted.

According to one aspect of the present invention, there is provided a conductive element of an armature for an electrical machine, comprising a metal strip having a pair of leg portions joined together at or about one end by a flat bridging portion, the first and second leg portions being bent in opposite directions perpendicularly to the plane of the bridging portion.

The armature may be easily constructed by arranging a number of such conductive elements with even circumferential spacing around a circle, to form the structure of the armature.

Preferably the first and second leg portions have a substantially equal width so that the assembled rotor consists of two winding planes of equal thickness, perpendicular to the axis of rotation.

However, in an alternative embodiment each conductive element may have three leg portions joined together at or about one end to a bridging portion, the two outer leg portions on either side of the bridging portion being bent in the same direction perpendicularly to the plane of bridging portion, and the middle leg portion being bent in an opposite direction.

In this alternative embodiment, the middle leg portion preferably has twice the width of each of the outer leg portions, so that the armature, when assembled, has three winding planes perpendicular to the axis of rotation, the middle winding plane having twice the thickness of each of the outer winding planes. This construction reduces shearing between the winding planes at high rotation speed and therefore reduces the risk of damage to the armature.

Preferably, each of the leg portions includes a radial portion, in which the current carried in the winding interacts with an applied magnetic field, and an outer portion which is bent towards the tangential direction of the armature so that it may be joined to another conductive element displaced around the circumference of the armature.

Preferably, the above-mentioned conductive element is stamped from metal sheet and the first and second leg portions are bent in opposite directions perpendicular to the metal sheet. In the method of forming the conductive element having three leg portions, the middle leg portion is bent in one direction perpendicular to the metal sheet, while the outer leg portions are bent in an opposite direction.

According to another aspect of the present invention, there is provided a conductive armature for an electrical machine, having a current-carrying winding formed from a plurality of integrally formed conductive elements circumferentially distributed around the armature, in which the radially outer portions of adjacent conductive elements have a gap between them to allow cooling fluid to flow through the radially outer portion of the armature. Each conductive element has a radially outer portion bent towards the tangential direction of the armature, the gap between adjacent conductive elements extending along a substantial portion of the length of the radially outer portions.

Adjacent ones of the conductive portions abut against each other in a radially inner area of the radially outer portions. Thus, cooling fluid is contained within the radially outer portion of the conductive elements, thereby enhancing cooling in the radially outer portions.

According to another aspect of the present invention, there is provided a conductive armature for an electrical machine, having a current-carrying winding comprising a plurality of circumferentially distributed integrally formed conductive elements, in which the surfaces providing the commutator are edge surfaces of the integrally formed conductive elements, adjacent ones of the conductive elements being spaced apart in the commutator area to allow cooling fluid to flow between the conductive elements in that area. As a result, greater cooling can be achieved in the commutator area, and brush dust, insulator and other debris are removed by the flow of cooling fluid.

Preferably, the major surfaces of the conductive elements in the commutator area are coated with an insulating material which is brittle or has relatively low wear resistance. As a result, electrical contact between adjacent conductive elements in the commutator area, caused for example by conductive brush dust, is prevented, while the insulating coating is worn down by contact with brushes which contact the commutator, in order to maintain a good contact between the brushes and the commutator. The insulating material which is worn away, together with brush dust and other debris, may then be removed by the cooling fluid flowing through the spaces between the conductive elements in the commutator area.

According to a further aspect of the present invention, there is provided a casing for an electrical machine having a rotor, the casing having cooling apertures to allow cooling fluid to flow into said casing, through the rotor and out of the casing when the rotor rotates, at least some of the apertures being louvres located in the radially outer portion of the casing, the louvres being inclined to direct out of the casing cooling fluid which circulates in the casing when the rotor rotates. Others of the apertures may be also located in a radially outer portion of the casing and may be louvres inclined to direct cooling fluid into the casing when the rotor rotates. In this way, the flow of cooling fluid is driven through the casing by the action of the rotor, so that the rotor is self-cooled. Moreover, the cooling fluid flow is driven when the rotor rotates in either direction.

Preferably, the louvres inclined in a first sense are arranged in a first plane perpendicular to the axis of rotation of the rotor, while the louvres inclined in a second, opposite sense are arranged in a second plane parallel to the first plane, so that cooling fluid is directed through the casing and through the rotor with an axial component when the rotor rotates.

Alternatively, apertures may be disposed in a radially inner portion of the casing, whilst louvres are disposed in a radially outer portion of the casing, arranged to direct air out of the casing when the rotor rotates. Thus, air is drawn into the apertures and directed out of the louvres, the flow of cooling fluid from the apertures to the louvres being assisted by the centrifugal force on the fluid circulating within the casing.

Preferably, the casing may include a fluid passage having an inlet arranged on the opposite side of the rotor from the apertures, and an outlet arranged to direct cooling fluid onto a radially outer portion of the rotor. Thus, the cooling fluid flows through the rotor from the apertures to the inlet of the fluid passage and is directed in an axial direction at a radially outer portion of the rotor towards the louvres. In this embodiment, the action of the louvres reduces the pressure of cooling fluid within the casing, thereby drawing cooling fluid into the apertures at the radially inner portion. Because the louvres are inclined in one sense only, this embodiment is only effective in one direction of rotation of the rotor.

Preferably, the rotor for use with the casing has gaps at its radially inner and radially outer portions which permit cooling fluid to flow axially through the rotor at these portions. Preferably, the rotor is a disc rotor with either the radially inner or radially outer portions of either or both of the faces providing the commutator, so that the cooling fluid flows through the rotor in the commutator area.

According to another aspect of the present invention, there is provided a rotor for an electrical machine, having a current-carrying winding comprising a plurality of circumferentially distributed conductive elements each having ends which lie at a radially outer region of the rotor, interconnections between said ends being made by interconnecting members having vanes arranged to direct cooling fluid axially across said ends.

According to another aspect of the present invention, there is provided an electric machine comprising a current-carrying rotor and a stator for producing an axial magnetic field through the rotor, the axial spacing between the rotor and the stator being variable, so as to vary the magnetic field in the rotor.

Preferably the stator comprises first and second sets of permanent magnets arranged on opposite sides axially of the rotor, the first and second sets of permanent magnets being supported respectively on first and second support members coupled to move in opposite axial directions relative to the rotor.

The separation between the first and second support members may be varied by camming means arranged between the members, or by one or more screw threaded rods engaging the first and second support members.

Specific embodiments of the present invention will now be described with reference to the accompanying drawings, in which:

FIG. 2b shows a detail of the rotor of FIG. 2a;

FIG. 6a is a side elevational view in an axial direction of a casing in accordance with the present invention;

FIG. 6b is a view in a radial direction of the casing of FIG. 6a;

FIG. 7 is a cross-sectional view through the axis of rotation of an electrical machine having another embodiment of a casing in accordance with the present invention;

Figure 1:
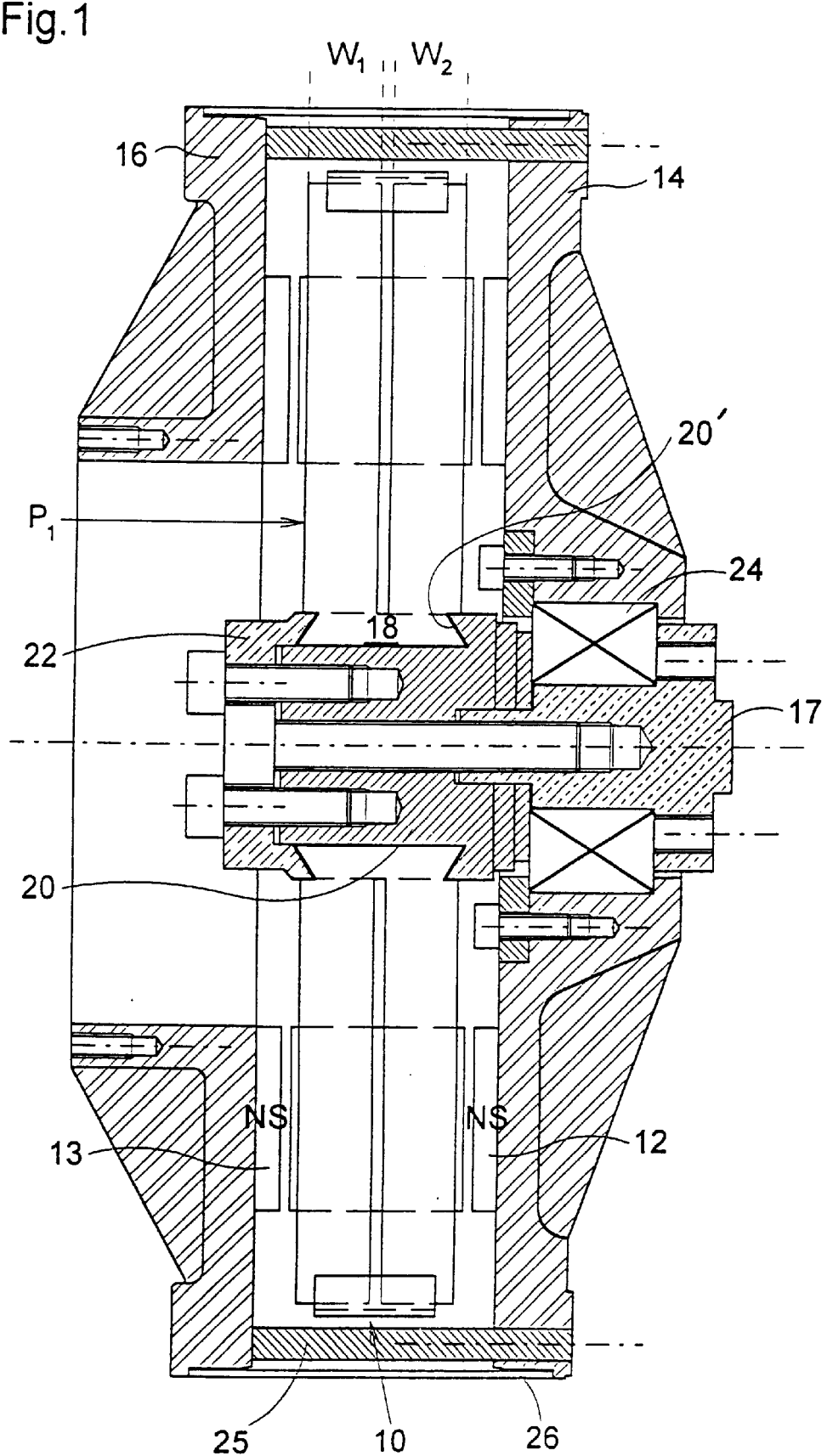
FIG. 1 is a cross-section in an axial plane an electric motor embodying aspects of the present invention.

FIG. 1 shows an electric motor having a rotor 10, through which current flows, and two sets of permanent magnets 12 and 13 arranged on respective opposite axial sides of the rotor 10. The magnets 12 and 13 are mounted on respective first and second stator plates 14 and 16. Each of the stator plates 14, 16 thus carries a set of permanent magnets arranged in a circle with alternately opposite magnetic poles thereof facing the rotor. The circles of magnets are arranged in mutual register so that each magnet 12 on one side of the rotor is aligned in a direction parallel to the rotor axis with a corresponding magnet 13 on the other side of the rotor. Each such pair of opposite magnets 12, 13 is arranged with opposite magnetic poles facing the rotor, as shown in FIG. 1. The magnets may be ferrite magnets or rare earth element magnets.

Electric current is supplied to the rotor 10 through brushes (not shown) at commutator points $P_1$.

The rotor 10 includes a dove-tailed portion 18 which is fitted onto a hub 20 which is shaped with an annular inclined shoulder 20' to inter-engage with the dove-tailed portion 18. The rotor 10 is clamped onto the hub 20 by a cap 22 which is bolted onto the hub 20. The hub 20 is connected to a spindle 17 which is rotatably mounted in the first stator plate 14 by means of bearings 24. The first and second stator plates 14 and 16 are joined by spacer rods 25 and the spacing between them is closed by a cylindrical casing 26.

Figure 2A:
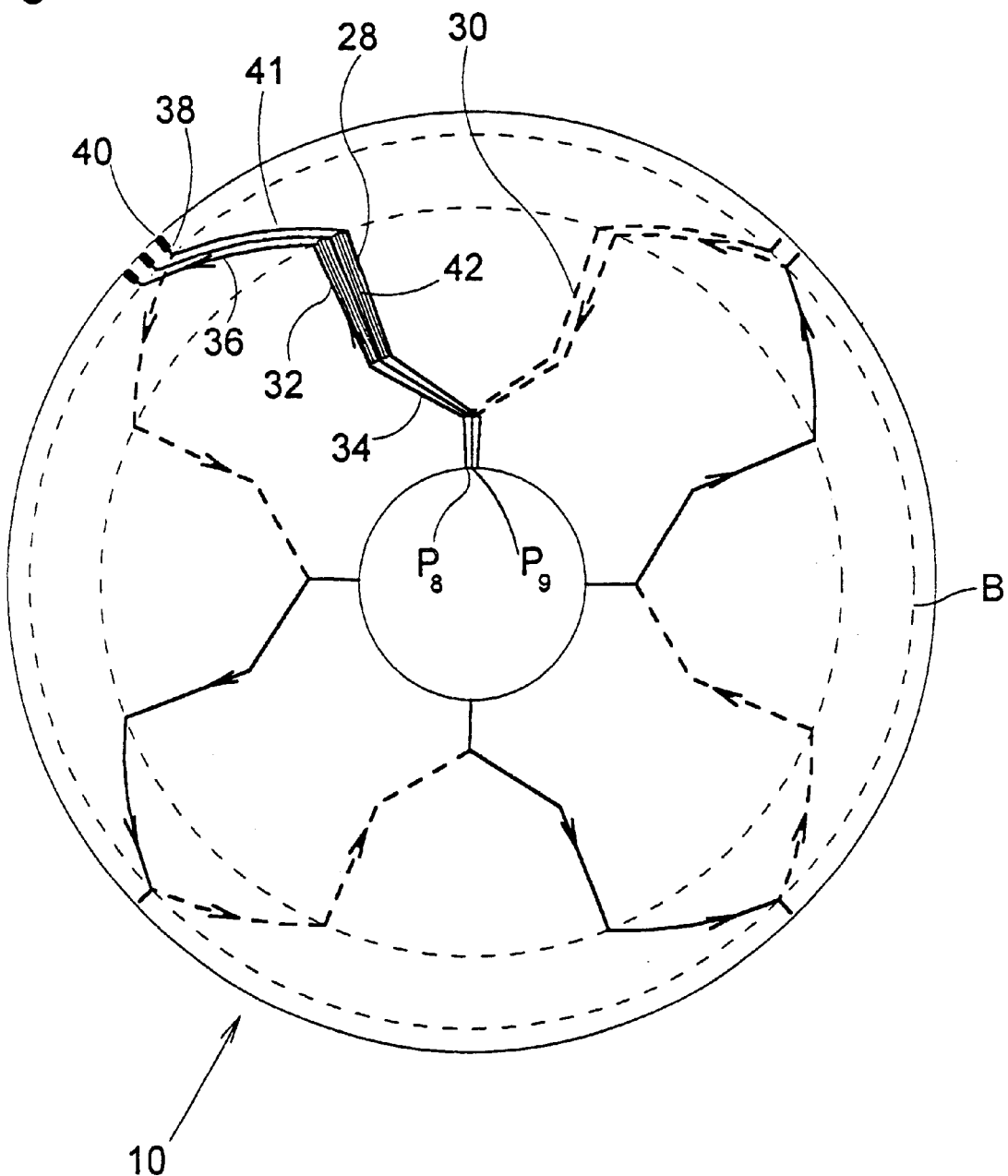
FIG. 2a is a schematic view in the axial direction of the rotor of the electric motor shown in FIG. 1.
Figure 2B:
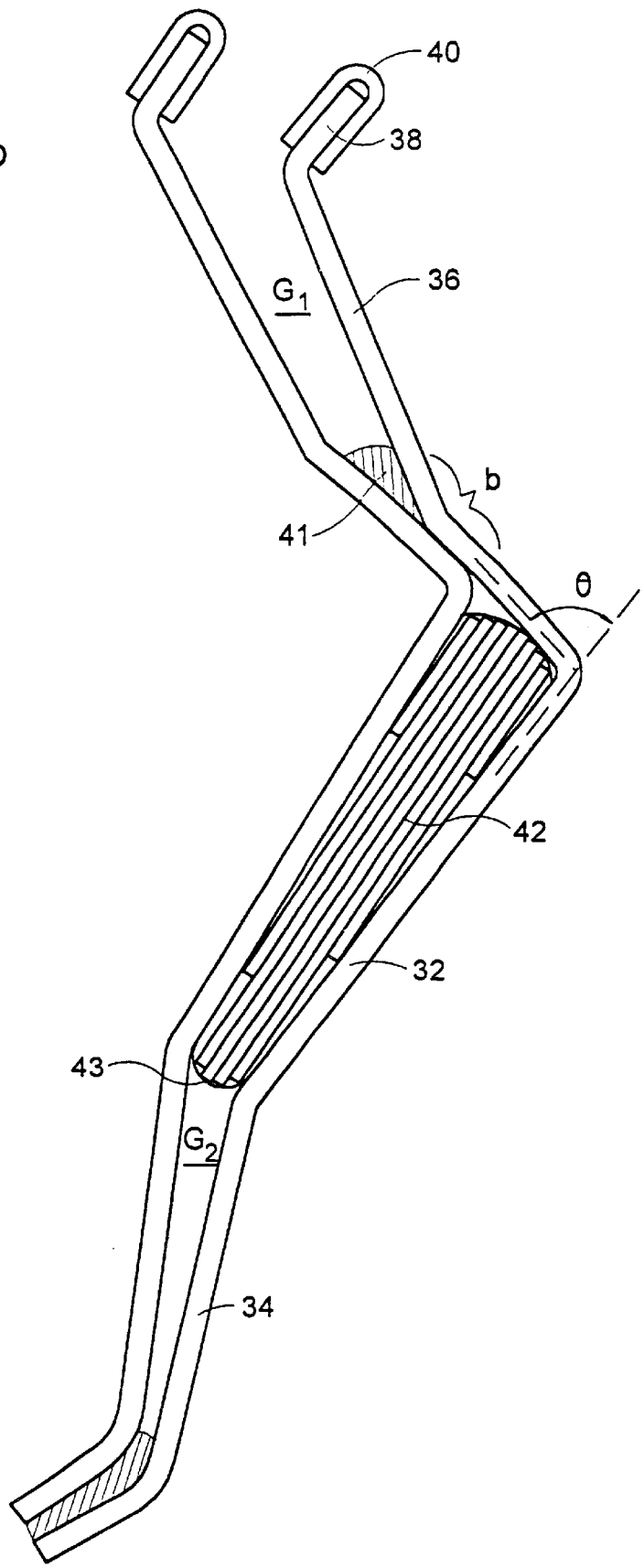

Referring also to FIGS. 2a and 2b, the rotor 10 is constructed as a disc from a number of circumferentially spaced winding portions. First winding portions 28, shown in solid outline, are arranged in a first plane $W_1$ perpendicular to the axis of the rotor, while second winding portions 30, shown in dotted outline, are arranged in a second plane $W_2$ parallel to the first plane, behind the first winding portions 28. Each winding portion 28, 30 includes a radially extending section 32, through which the magnetic field passes, a radially inner section 34 bent in one circumferential sense at a shallow angle to the radially extending section 32, and a radially outer section 36 bent in the opposite circumferential sense at a substantial angle θ less than 90° relative to the radially extending section 32 towards the tangential direction. The radially outer section 36 terminates in an outwardly turned end section 38. The end section 38 of each first winding portion 28 in the first plane $W_1$ is connected to an adjacent end section 38 of a second winding portion 30 in the second plane $W_2$ and at the same circumferential position by a connecting cap 40 soldered onto the end sections 38. As the first and second winding portions are bent in opposite directions, the radially extending section 32 of the second winding portion 30 is displaced around the circumference of the rotor from the radially extending section 32 of the first winding portion 28 by an angle approximately equal to the pitch of the permanent magnets 12 or 13 on the respective stator plates 14 or 16. Thus, the electromagnetically generated tangential forces on the radially extending sections 32 of the first and second winding portions 28 and 30 are in the same sense. Each winding portion 28 is also in electrical contact with a second winding portion 30 at their radially inner sections 34 so that the current path alternates between the first and second winding portions 28 and 30.

The current path around the rotor is shown by arrows in FIG. 2a, which shows that starting at an arbitrary starting point, such as point $P_8$ at the inner end of one first winding portion 28, the current path in one cycle around the rotor 10 does not return to that starting point but to an adjacent point $P_9$ displaced by one winding pitch from the starting point $P_8$. Thus, the first and second winding portions 28, 30 are connected together in a continuous current-carrying loop to form the wave-wound rotor 10.

The magnetic field strength across the radially extending sections 32 is enhanced by laminations 42 of a material having high magnetic permeability, for example mild steel, silicon steel or soft iron, which are inserted in stacks in the spaces between radially extending sections 32 of the winding portion 28 and 30. As shown in greater detail in FIG. 2b, an insulating wrapper 43 is first placed in the spaces and then the stacks are placed within it.

However, gaps $G_1$ between adjacent radially outer sections 36 and gaps $G_2$ between adjacent radially inner sections 34 are kept open to allow air, constituting a cooling fluid, to flow between the winding portions 28, 30.

Fluid flow trough the gaps $G_1$ may be guided by allowing the radially outer sections 36 of adjacent winding portions 28, 30 to contact each other at a section b, which in this case is at the junction bend between the radially extending section 32 and the radially outer section 36. Thus, cooling fluid flows axially between the radially outer sections 36, where a large surface area of the winding portions 28, 30 is exposed and is prevented from flowing past the section b in a tangential direction.

In one example, the section b extends over approximately a third of the length of the radially outer sections 36, with the remaining two-thirds of the length being open to the cooling fluid.

Furthermore, to ensure a strong mechanical bond between the winding portions, the sections b between each of the winding portions 28, 30 are impregnated with resin 41. Thus, a continuous bonded section B is formed extending circumferentially completely around the rotor 10, as shown in FIG. 2a.

Figure 3A:
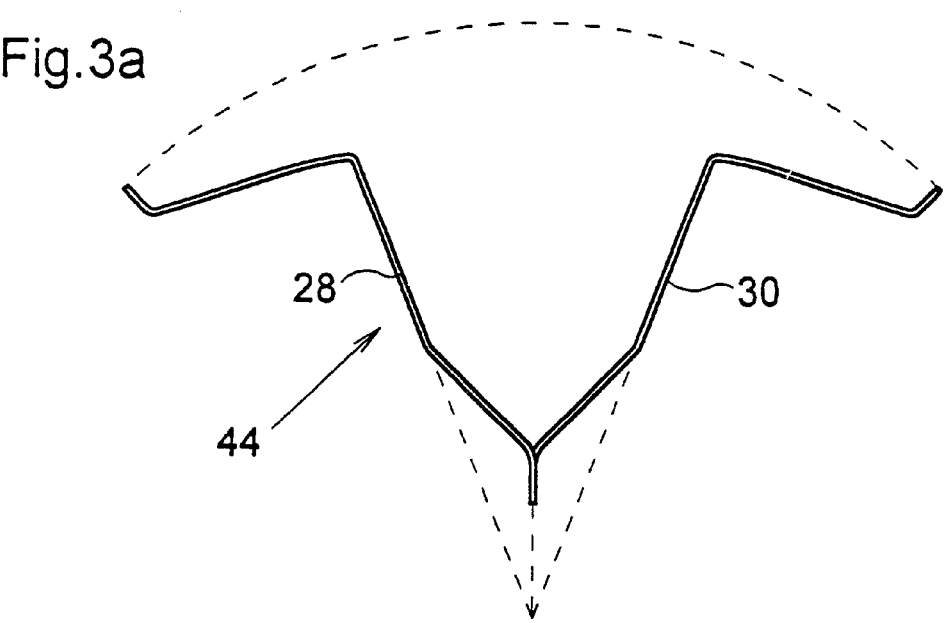
FIG. 3a is a view in an axial direction of a single conductive element.
Figure 3B:
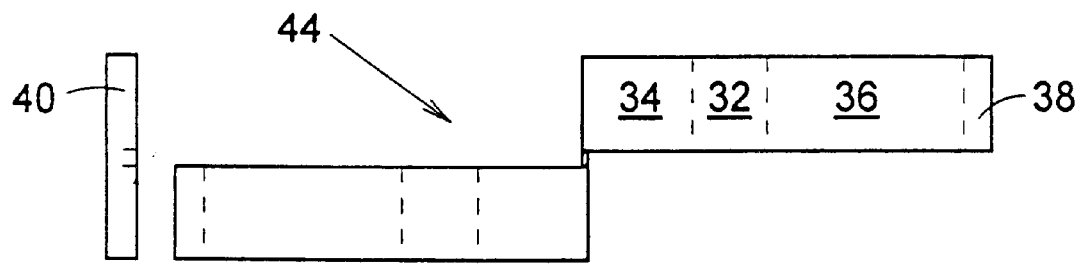
FIG. 3b is a view of the conductive element of FIG. 3a in a radial direction.
Figure 3C:
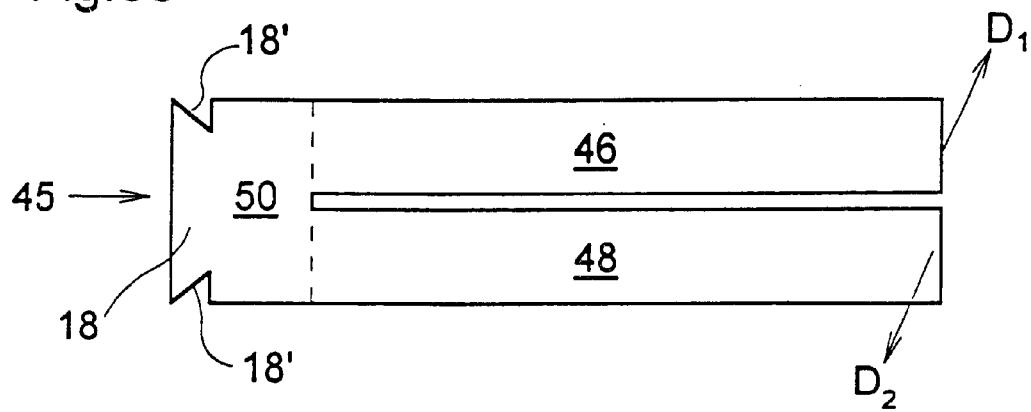
FIG. 3c is a plan view of a blank from which the conductive element of FIGS. 3a and 3b is formed.

As shown in FIGS. 3a to 3c, a pair of first and second winding portions 28, 30 are formed integrally from a conductive element 44. Each conductive element 44 is formed from a blank 45 of metal strip which is stamped from a metal sheet and comprises a pair of parallel strip portions in the form of legs 46 and 48 which form respectively the first and second winding portions 28 and 30. The leg portions 46 and 48 are joined together at their radially inner ends by a bridging portion 50. The dove-tail section 18 of the rotor 10 is formed in the bridging portion 50 by stamping indentations 18' in either side. The legs 46 and 48 are bent in opposite directions $D_1$, $D_2$ perpendicular to the plane of the flat bridging portion 50 and are suitably bent to form the first and second winding portions 28, 30 having radially inner sections 34, radially extending sections 32, radially outer sections 36 and end sections 38.

Each conductive element 44 is powder coated with insulating material, such as epoxy resin, in all areas apart from the end sections 38 and baked to form an insulating coating on the element before assembly.

To assemble the rotor, the required number (129 in a particular example) of such bent conductive elements 44 are mutually positioned in a nesting arrangement with circumferentially equal spacing to form the disc structure of the rotor and the connecting caps 40 are soldered onto the end sections 38. Then the rotor 10 is placed on the hub, with the dove-tail portion 18 resting against the inter-engaging shoulder portion 20'. The cap 22 is fitted onto the hub 20 so that the dove-tail portion 18 is clamped between the cap 22 and the inter-engaging shoulder portion 20'. The laminated pieces 42 are then inserted in the ring of gaps between the radially extending sections 32.

Figure 4:
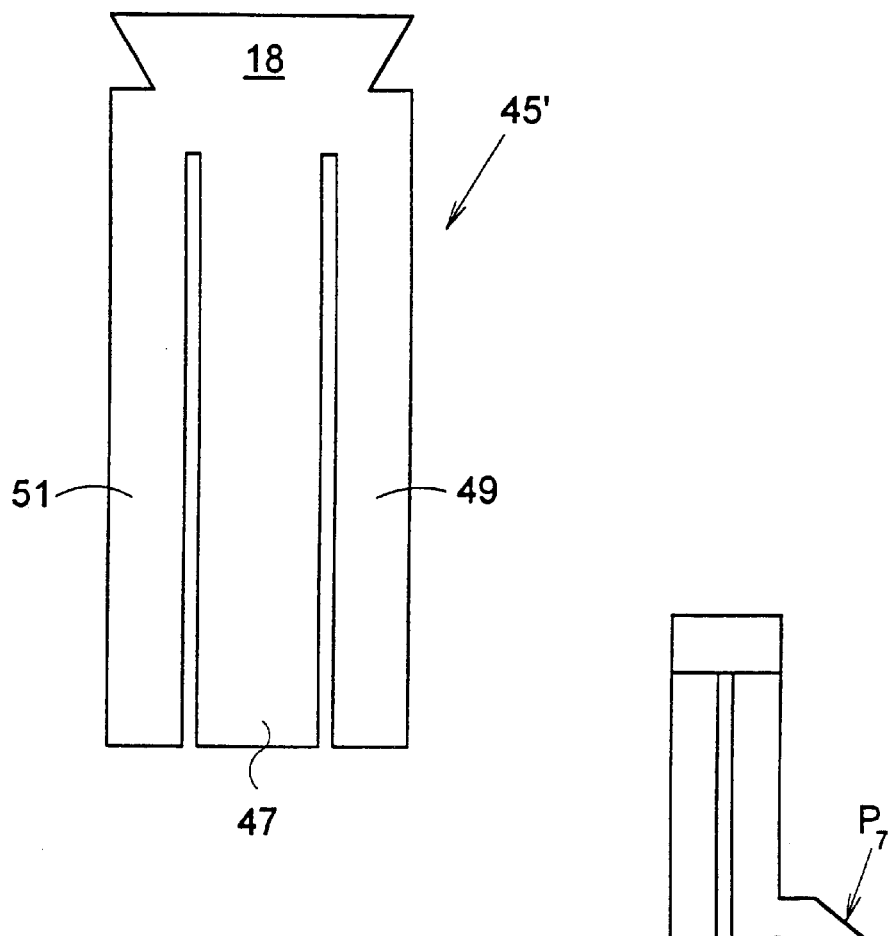
FIG. 4 is a plan view of a blank from which an alternative conductive element is formed.

In a particularly advantageous arrangement, edge portions of the conductive elements form the commutator of the electric motor, these being edge portions of either the radially inner sections 34 or the radially outer sections 36. The insulating coating on the edges of the conductive elements 44 is removed from the commutator area before use. Alternatively, the edge portions may be masked during the powder coating operation so that the insulating powder is not deposited on these portions. The insulating material remaining on the broad faces of the conductive elements 44 is brittle or has a low resistance to wear so that, as the edges of the elements 44 are worn by contact with the brushes, the insulating material on the faces is also worn away at the face portions adjoining these edge portions forming the commutator and does not prevent the brushes from contacting the commutator. As the insulating material is worn away, it disintegrates into particles and is carried away by the cooling fluid flowing through the gaps $G_1$ or $G_2$ and therefore does not accumulate in the commutator area. FIG. 4 shows an alternative form of blank 45' having three legs 51, 47 and 49. The width of the middle leg 47 is twice that of each of the outer legs 51 and 49. The outer legs 51 and 49 are bent in the same direction perpendicular to the strip, while the middle leg 47 is bent in an opposite direction to form an alternative conductive element. When assembled, the alternative conductive elements form a rotor in which the legs 51 and 47 form first and second winding portions 28 and 30 in first and second winding planes $W_1$ and $W_2$ while the leg 49 forms a third winding portion in a third winding plane parallel to the first and second winding planes.

The three-plane construction reduces the problem of shearing between winding planes at high speeds, which is caused by the winding portions tending to straighten under high centrifugal forces. The division of the rotor into more winding planes of narrower width reduces the shearing forces between adjacent planes.

Figure 5:
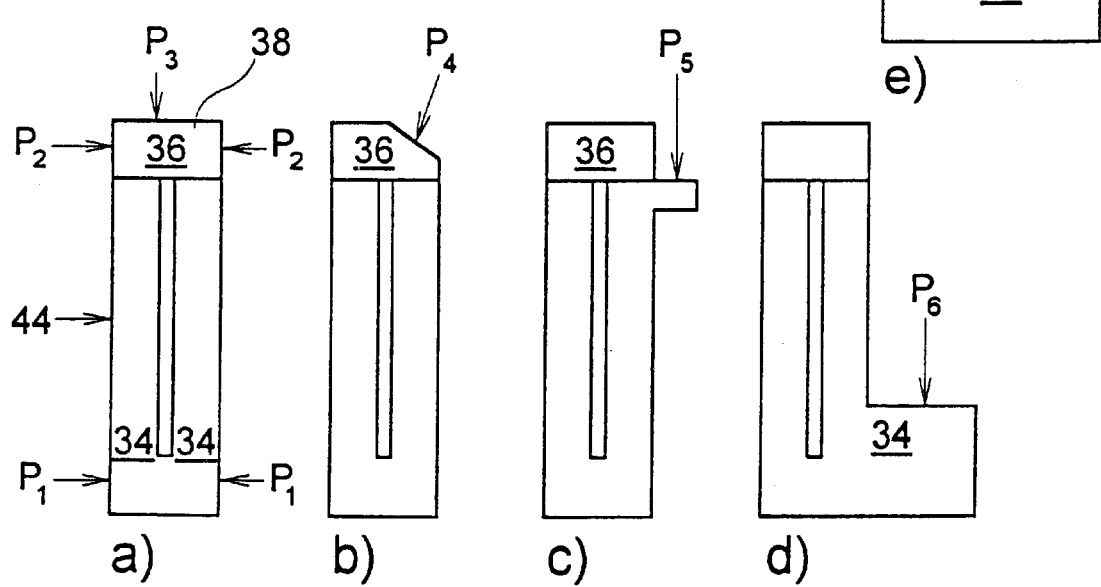
FIGS. 5a to 5e are plan views of alternative conductive elements showing commutating points.

FIG. 5a shows several possible points $P_1$, $P_2$, $P_3$ on the edges of each conductive element 44 which may form the commutator area. Points $P_1$ are on either outer edge of the radially inner section 34, points $P_2$ are on either outer edge of the radially outer section 36, and point $P_3$ is on the radially outer edge of the end section 38.

FIG. 5b shows a modified metal strip in which one side of the radially outer section 36 is chamfered to form a commutator edge at an angle relative to the face of the rotor 10. The brushes contact the commutator edge at the point $P_4$.

The position of the commutator may be varied further by stamping the blank 45 in a form which includes a lateral projection from one side. In the form shown in FIG. 5c, the lateral projection is located at the radially outer section 36, and in the assembled rotor will form a peripheral, axially projecting ring commutator which will be contacted by the brushes at the point $P_5$, while in FIG. 5d, the lateral projection is at the radially inner section 34 and will form an inner, axially projecting ring commutator adjacent the hub for contact by the brushes at the point $P_6$. In another possible form shown in FIG. 5e, the radially inner lateral projection is chamfered to form an angled commutator edge at the point P₇. The various possible commutator points P₁, P₂, P₃, P₄, P₅, P₆, P₇ provide flexibility in the location of the brushes and therefore in the design of the electrical machine.

Referring to FIGS. 6a and 6b, the cylindrical casing 26 which is attached to the outer edges of the stator plates 14, 16 is provided with a first set 52 and a second set 54 of louvres inclined in opposite directions relative to the tangential direction of the rotor. Each set comprises a ring of circumferentially spaced louvres, which are formed by cutting or punching the cylindrical casing 26 to form apertures and surfaces inclined in one or the other tangential direction. When the rotor rotates in the direction R, air is drawn into the casing 27 through the first set of louvres 52, and is expelled From the casing through the second set of louvres 54. On the other hand, when the rotor rotates in the opposite direction R', air is drawn into the casing through the second set of louvres 54 and expelled through the first set of louvres 52.

As shown in FIG. 6b, the rings of the first and second sets of louvres 52 and 54 are spaced apart from each other in the axial direction. Thus, the airflow F through the casing has an axial component and is forced through the gaps G₁ of the rotor 10.

In an alternative cooling arrangement shown in FIG. 7, the first stator plate 14 has a set of apertures 56 formed in a ring at a radially inner position. Air flows through the apertures 56 and the gaps G₂ at the radially inner part of the rotor into an annular air passage 58 or space through inlets 60 formed at a radially inner part of the second stator plate 16. This passage or space 58 is closed by an outer cover plate 61. The air flows radially through the air passage 58 and thence back into the space between the stator plates through outlets 62 formed at a radially outer part of the second stator plate 16. The air then passes through the gaps G₁ and out of the casing through louvres 64 which are all inclined to force air out of the casing 26. The air passage 58 is closed to the surroundings of the casing 26 and therefore the action of the louvres 64 on the air rotating with the rotor just inside the casing is to create a suction which draws air into the apertures 56 and through the air passage 58. In this embodiment, brushes 66 contact the edges of the winding portions 28, 30 in the area of the gaps G2, so that air flows through the commutator area. Moreover, air flows through the rotor in the commutator area in a direction towards the commutator surface and flows over the brushes in a direction away from the rotor, thereby carrying brush dust away from the commutator area.

Figure 8:
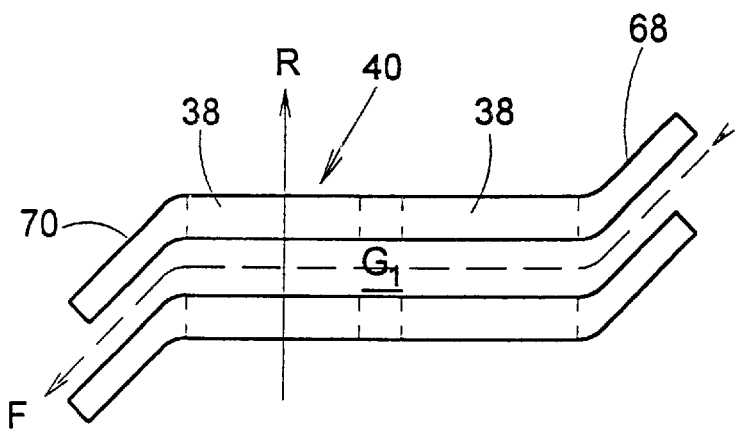
FIG. 8 is a view in a radial direction of a portion of a rotor in accordance with one aspect of the present invention.
Figure 9:
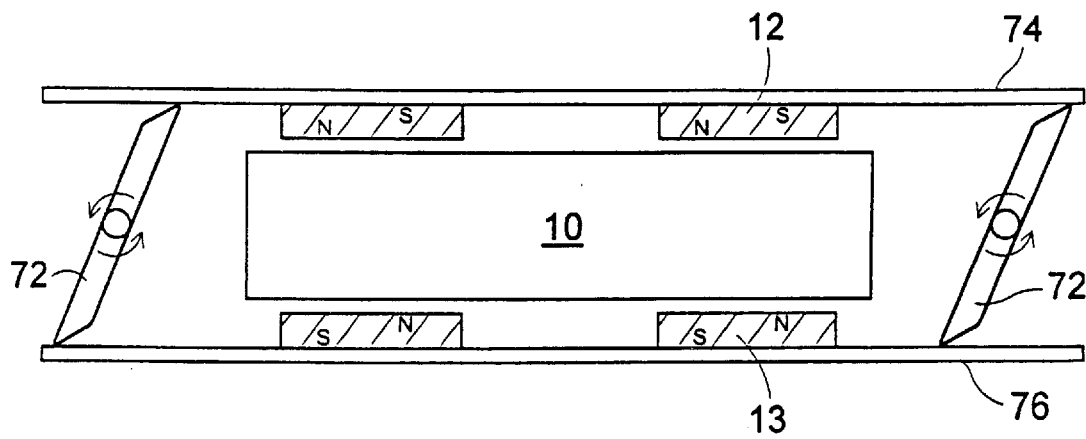
FIG. 9 is a diagrammatic end view of an electrical machine in accordance with a further aspect of the present invention.

As shown in FIG. 8, which shows two adjacent peripheral interconnections between end sections 38, viewed end-on in an inward radial direction, in an alternative embodiment the connecting caps 40 project beyond the rotor in the axial direction and the projecting portions are angled to form a first vane 68 inclined towards the direction of rotation R and a second vane 70 inclined away from the direction of rotation R. Thus, the vanes 68 and 70 act as fan blades to direct the flow F of air through the gap G₁, thus enhancing the cooling effect.

The combination of the rotor shown in FIGS. 2a and 2b with the casing shown in either FIG. 6b or FIG. 7 and optionally the connecting caps 40 shown in FIG. 8, provides a particularly advantageous cooling effect in which cooling fluid is directed through sections of the rotor in which the cooling effect of the fluid is optimised.

To allow mechanical variation of the running speed of the electric motor, the spacing between the magnets 12, 13 and the rotor 10 may be adjusted as shown in FIG. 8 so as to vary the strength of the magnetic field applied to the rotor 10. In this embodiment, the magnets 12, 13 are mounted on first and second axially movable stator plates 74 and 76. The axially movable stator plates 74, 76 are biased towards each other by the mutual magnetic attraction of the magnets 12 and 13 which are arranged with opposite poles facing each other. The plates 74, 76 can be forced apart by rotatable cams 72 which contact the plates 74, 76. Alternatively, the separation between the movable plates 74 and 76 may be adjusted by one or more screw threaded rods which pass through apertures in the plates 74, 76, and have opposite handed screw threads in the sections which engage the first and second stator plates 74, 76. As a further alternative, the separation may be adjusted by one or more screw-threaded rods which have a single screw thread which engages one of the stator plates 74, 76 and which abuts the other of the stator plates 74, 76. The stator plates 74, 76 are held in position by springs or by the mutual magnetic attraction of the magnets 12 and 13.

While the above embodiments include a current-carrying rotor and a magnet-carrying stator, it is clear that the current-carrying member could be held stationary, and the magnetic portion allowed to rotate. Although the stator described above carries permanent magnets, electromagnets may also be used.

Thus, the present invention provides a rotor for an electric machine, which is inexpensive to manufacture, and a casing for a self-cooling electrical machine that does not require separate cooling means to achieve high performance.

What is claimed is:

1. A rotor for an electrical machine, having a current-carrying winding comprising a plurality of circumferentially distributed winding portions which lie in at least one winding plane perpendicular to the rotor axis, and extend from a radially inner region to a radially outer region, the winding being formed from a plurality of conductive sections each having ends which lie at said outer regions, interconnections between said ends of said winding section being made by interconnecting members having vanes arranged to direct cooling fluid over said ends, and wherein said vanes comprise first and second vane portions on each interconnecting member projecting respectively on opposite axial sides of the rotor and inclined toward opposite circumferential directions.

2. An electrical machine having a rotor as claimed in claim 1 and a casing having first and second sets of cooling vents enabling cooling fluid to flow respectively into and out of said casing when said rotor rotates, the first and second sets of vents being disposed in a radially outer portion of the casing and being arranged to direct cooling fluid tangentially into and out of, respectively, said casing.

3. A conductive rotor for an electrical machine, having a current-carrying winding comprising a plurality of circumferentially distributed winding portions which lie in at least one winding plane perpendicular to the rotor axis, and extend from a radially inner region to a radially outer region, wherein each winding portion includes a radially extending section and a radially outer section inclined circumferentially at an angle less than 90 degrees relative to the radius in which said radially extending section lies, wherein the radially outer sections of adjacent winding portions are spaced apart over a first, substantial portion of the length of the radially outer sections to allow fluid flow therebetween through the winding in an axial direction of the rotor, and adjacent ones of the winding portions contact each other at a second portion of the length of the radially outer sections adjacent a radially inner end of the radially outer sections.

4. A conductive rotor as claimed in claim 3, in which adjacent ones of the winding portions are bonded together at said second portion such that the winding portions of the rotor are continuously bonded together in an area extending circumferentially completely around the rotor.

* * * * *